April 17, 1962   B. H. ACOMB ETAL   3,029,840
GAS RATIO CONTROLLER

Filed Dec. 30, 1957   3 Sheets-Sheet 1

*INVENTORS*
BYRON H. ACOMB
ROBERT G. PENNSTROM
DONALD W. CARKHUFF

BY Richard S. Shreve
ATTORNEY

April 17, 1962 B. H. ACOMB ETAL 3,029,840
GAS RATIO CONTROLLER
Filed Dec. 30, 1957 3 Sheets-Sheet 2
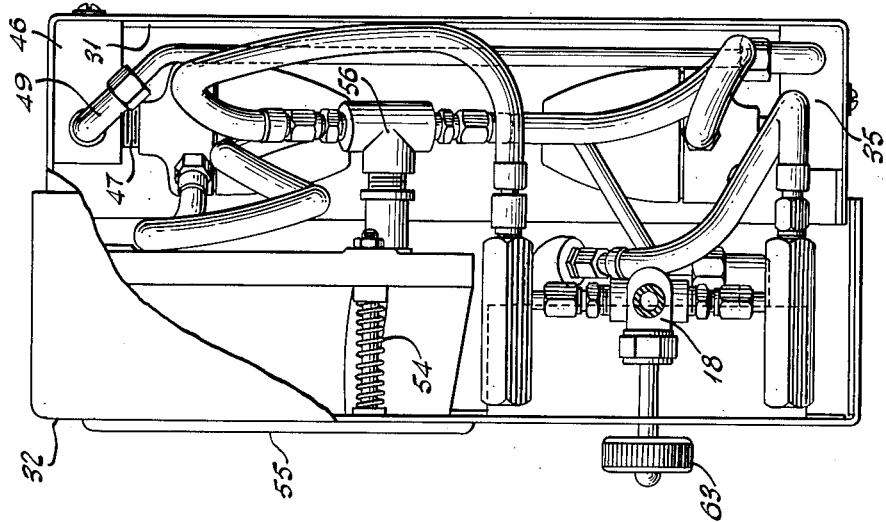
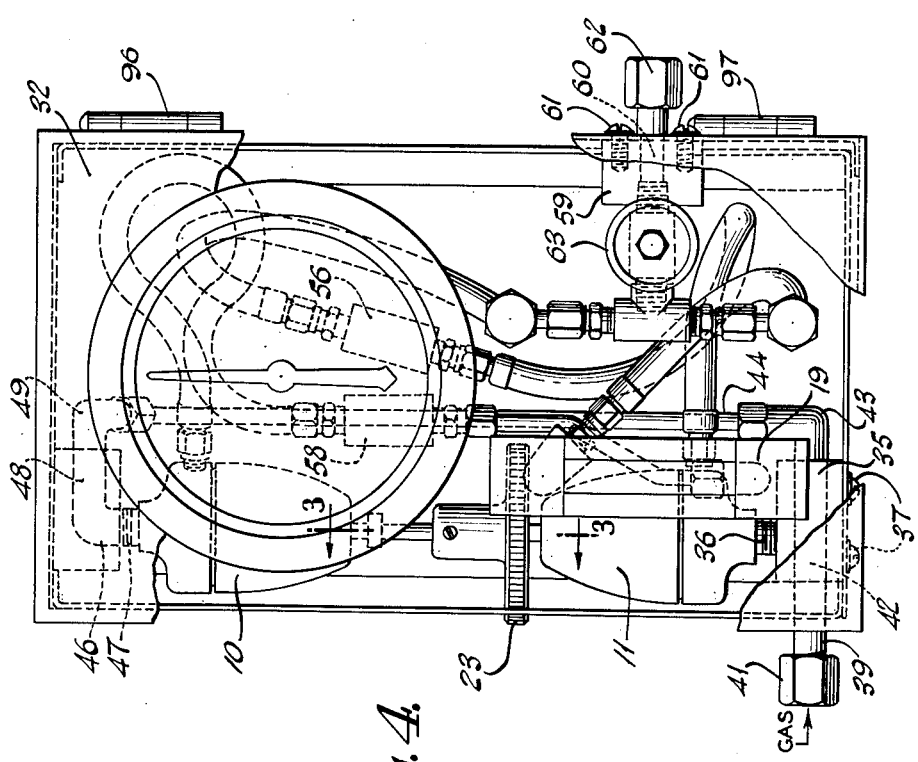
INVENTORS
BYRON H. ACOMB
ROBERT G. PENNSTROM
DONALD W. CARKHUFF
BY Richard S. Shreve Jr.
ATTORNEY April 17, 1962

B. H. ACOMB ETAL 3,029,840

GAS RATIO CONTROLLER

Filed Dec. 30, 1957

INVENTORS
BYRON H. ACOMB
ROBERT G. PENNSTROM
DONALD W. CARKHUFF
BY Richard S. Shreve
ATTORNEY

United States Patent Office 3,029,840
Patented Apr. 17, 1962

3,029,840
GAS RATIO CONTROLLER
Byron H. Acomb, Watchung, Robert G. Pennstrom, Neptune, and Donald W. Carkhuff, Jamesburg, N.J., assignors to Union Carbide Corporation, a corporation of New York
Filed Dec. 30, 1957, Ser. No. 706,107
3 Claims. (Cl. 137—609)

This invention relates to a gas ratio gas flow control system and particularly to such a system adapted to accurately proportion quantities of gases in a desired ratio.

The increasing use of specific ratios of mixed gases at variable flows in the electric arc welding processes created the need for a means of accurately metering shielding gas flows, and means for controlling these metered gas flows so as to provide variable total mixed gas flows of the desired ratio for a specific application.

Many manufacturing plants have need at individual stations for relatively small volumes of two gases accurately mixed to a constant ratio. Under such conditions it is generally uneconomical to pipe mixed gas throughout the plant as the desired mixtures at individual stations may vary. Thus, by having for example, piped argon and piped helium, or cylinders of each gas at the station, and a means of accurately metering and mixing these two gases, each station can produce its own desired gas mixture.

The accurate metering of relatively small gas flows, prior to this invention, has been economically impractical. The use of very accurate metering orifices having diameters of .020-in. or less for this purpose have raised extremely difficult manufacturing problems. If such orifices are drilled, even the normal tolerance of the drill can cause an error of about 20 percent in the gas flow. In addition, the shape of the square, chamfered or round orifice entrance can cause as much as a 15 percent variation or error in the desired gas flow, also the entrance on such a small size orifice cannot be controlled in production. Similarly, the use of adjustable throttle valves is impractical for this purpose. Even with a tapered throttle valve stem having the smallest practical angle converging to a point, and the finest practical pitch thread, only a fraction of a turn of the valve stem is required to go from no flow to full flow, giving an insufficient sensitivity to the flow adjustment.

It is, therefore, an object of the invention to provide a gas ratio control system capable of accurately mixing and metering a desired mixture of gases.

A further object is to provide a novel type of metering orifice.

In the drawings:

FIG. 4 is an elevation view of the apparatus with the cover partially removed to show internal components;

FIG. 5 is a side elevation of FIG. 4 with part of the box and cover partially removed to show internal components;

Generally speaking, the invention provides an apparatus including the combination of two regulators having a common pressure-adjusting screw, with two pre-set proportioning orifices, a flowmeter, and a mixed gas throttling valve capable of producing a variable total mixed gas flow of the desired ratio for a specific application.

There is further included in the apparatus a novel proportioning device having an orifice for accurately metering small gas flows comprising essentially a length of hypodermic tubing into which a length of wire may be inserted to a particular depth depending upon the desired gas flow. Thus, the effective length of the tubing is varied to utilize wall friction as the flow adjusting means while the cross sectional area remains unchanged. Such orifices can be readily produced in large numbers by mass production methods. Essentially, the principle of operation of this gas ratio controller depends upon maintaining exactly equal upstream pressures on the two gases being proportioned and subsequently mixed.

Figure 1:
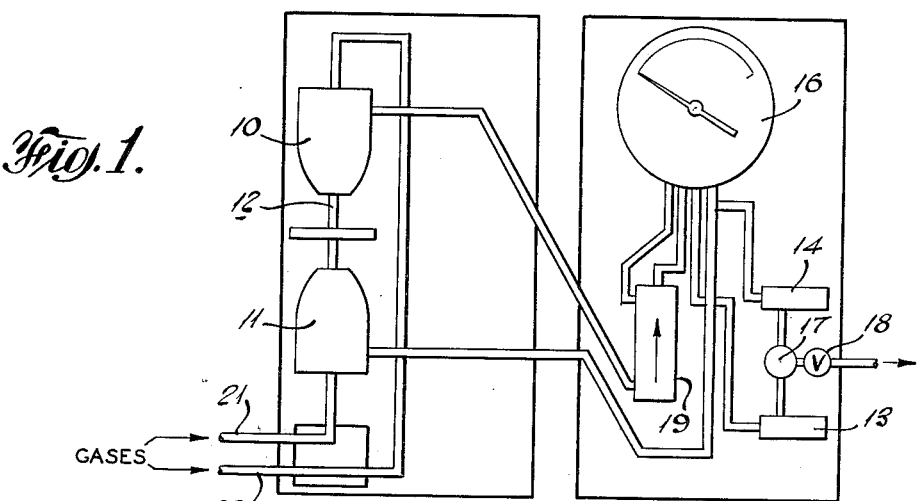
FIG. 1 is a schematic drawing of the required component parts of the invention.

Referring to FIG. 1, the gas ratio controller comprises essentially two regulators 10 and 11 joined by a common pressure adjusting screw assembly 12 for delivering two gases to the pre-set calibrated orifices 13 and 14, at identical pressures immediately upstream of the orifices. A differential pressure gauge 16 provides a means of ensuring that the pressures immediately upstream of the two metering orifices are identical. The two metered gas flows are combined in the T connection 17 and the total mixed gas flow is controlled by means of the throttle valve 18. The total mixed gas flow is then ascertained by means of a calibrated flowmeter 19 in one of the lines.

In describing the basic operation of the gas ratio controller, reference is again made to FIG. 1 of the drawing. For convenience, the gases referred to will be argon and helium. The two gases to be mixed are introduced through separate lines 21 and 22 at pressures preferably between 20 and 100 p.s.i. Each gas flows through respective regulators 10 and 11 to the calibrated metering orifices 13 and 14. Each metering orifice is calibrated and pre-adjusted to deliver the required flow of each gas at the same nominal upstream pressure, thereby providing the specifically desired constant ratio of mixed gas. Downstream of the orifices, the two gases united and are mixed at the T connection 17, then flow through a throttle valve 18 to the point of use. Thus, regardless of the amount of throttling, the gas pressures downstream of the two orifices 13 and 14 will always be equal when gas is flowing.

If a very small flow is used, there will be a very small pressure drop across the orifices 13 and 14. Since the flow depends upon such a pressure drop, any minor difference in orifice upstream pressures during small flows can cause a material error in the gas mixture ratio. Therefore, the accurate balancing out of the inlet pressures on the metering orifices, is essential to maintain a constant ratio of mixed gases. According to the invention, this accurate balancing is provided by means of the differential gauge 16 and pressure-adjusting screw assembly 12, which will be hereinafter described.

Figure 3:
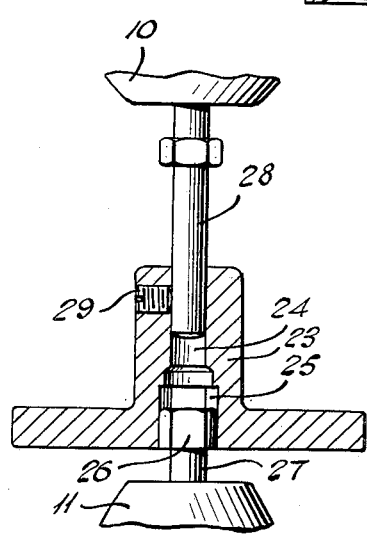
FIG. 3 is a partial, sectional view taken along line 3—3 of FIG. 4.

Initially, the two regulators 10 and 11 are pre-set for a delivery pressure of, say, 15 p.s.i. under nominal flow conditions. After once being set, the regulators are joined by the knurled coupling 23 shown in FIG. 3, such that they now have a common member. The knurled coupling 23 is provided with an axial opening 24 having a hexagonal recess 25 at one end thereof adaptable to receive the nut 26. Said coupling 23 is positioned in contact with the regulator stems 27 and 28 and fixedly located by a set screw 29 which may be threadably tightened against the regulator stem 28. By rotating this common pressure-adjusting screw assembly 12, the delivery pressure of one regulator will be increased and that of the other reduced.

Immediately upstream of the orifices 13 and 14, pressure taps are taken to the differential pressure gauge 16. As long as this gauge reads "zero," the pressure upstream of each orifice is the same. Should these indicated pressures become unbalanced, due principally to a change in total mixed gas flow, said pressures may be adjusted and a correct gas ratio re-established by a single movement of the common pressure-adjusting screw assembly 12.

The total mixed gas flow is determined by means of the flowmeter 19 connected into either of the gas lines downstream of the regulator. Since the ratio of the mixed gas is always constant, it is necessary only to measure the flow of the one gas. However, to simplify the gas measurement reading, the scale reading of this flowmeter indicates the total flow of both gases, or the mixed gas flow.

Figure 6:
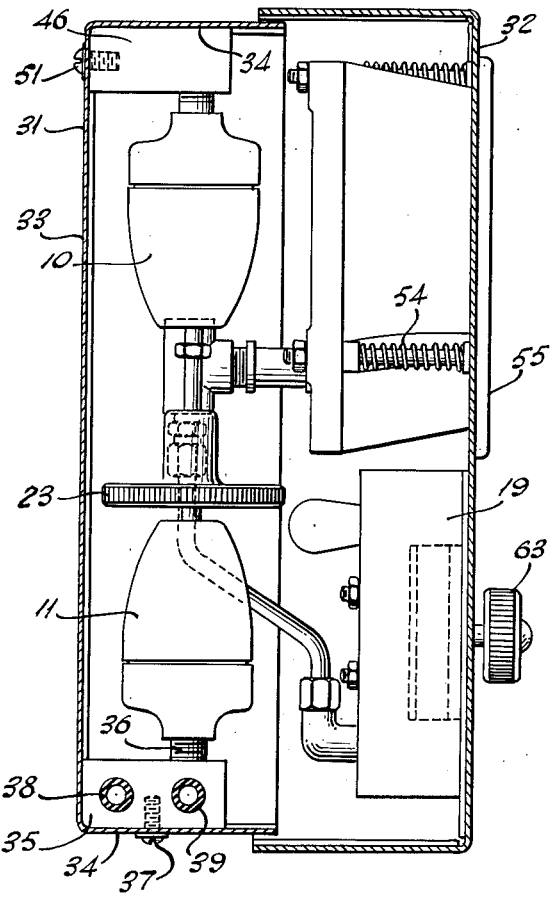
FIG. 6 is a side view of FIG. 4, partially in cross section showing the internal components.

For convenience and portability, the component parts are mounted in a closure comprising a hinged box 31 and cover 32, as shown in FIGS. 4, 5 and 6.

With particular reference to FIG. 6, it is seen that the box 31 comprises a rectangular sheet metal base 33 having an extended upturned lip 34 at each edge. The dual pressure regulators 10 and 11 are mounted vertically in the box 31. A portion of the knurled coupling 23 extends through a slot in the base 33 providing external adjusting means for the regulators 10 and 11.

Helium is directed to pressure regulator 11 which threadably engages a connecting block 35, by means of a threaded nipple 36 therebetween, the block 35 fastens to the box 31 by means of a pair of mounting screws 37. This block 35 is provided as shown in FIG. 6 with an argon inlet connection 39 and a helium inlet connection 38, each incorporating a hose connecting nut 41 thereon. A passage 42 in block 35 communicates with a threaded elbow connection 43 and an elongated length of metal tubing 44 whereby argon is directed to similar block 46.

The remaining pressure regulator 10 connects to block 46 by means of a threaded nipple 47 intersecting gas passage 48 in said block 46 which receives a threaded elbow 49 therein. Said elbow is joined to the argon carrying elongated tubing 44. Block 46 fastens to the box 31 by means of dual mounting screws 51.

Flexible tubing provides the gas connecting means between the majority of components thereby permitting the hinged box 31 and cover 32 to be readily swung open.

As may be seen in FIGS. 5 and 6, the cover 32 is sufficiently large to overlap the edges of box 31 in the closed position thereby forming a closure. The differential pressure gauge 16 is positioned in said cover 34 by 3 mounting bolts 54 and disposed with the dial face 55 external to the cover 32 where it may be readily observed.

Figure 7:
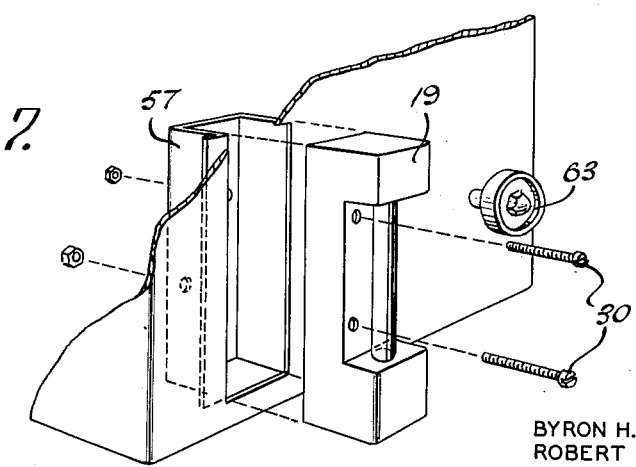
FIG. 7 is a fragmentary view showing the flowmeter and mounting means.

Flexible tubing from one regulator 10 connects to the inlet of flowmeter 19 also mounted in the cover 32. As shown in FIG. 7, dual mounting screw 30 locates the flowmeter in a formed bracket 57 where it too may be visible with the box 31 and cover 32 in the closed position. The other regulator 11 communicates directly with the differential gauge outlet 58 and the orifice devices 13 and 14. Both orifices are then connected through the T connection 17, the outlet of which leads to control valve 18.

This valve 18 fastens into a connecting block 59 which is positioned in the cover 32 by a pair of mounting screws 61. An internal passage 60 through said block 59 communicates the control valve 18 with an externally extending outlet hose connection 62. The control stem of said valve 18 passes through the cover 32 and is provided with a circular knob 63 for adjustment.

Figure 2:
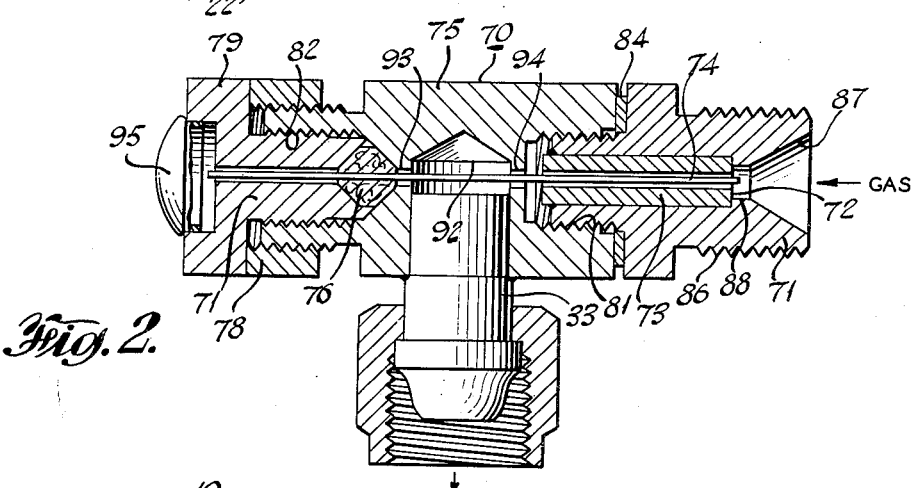
FIG. 2 is a view showing a longitudinal cross section of an orifice metering unit included in such apparatus.

In FIG. 2 is shown an embodiment of the adjustment orifices 13 and 14 heretofore referred to; said orifices being incorporated into a flow metering spud assembly 70. In operation, the gas to be metered enters inlet connection 71, flows through the annular space 72 defined by the inside diameter of the tubing 73 and the outside diameter of an adjusting wire 74. The position of the wire 74 with respect to the tube 73, is controlled and may be longitudinally preset according to the gas flow desired. After the wire 74 has been adjusted to the particular degree of insertion into tubing 73 to give the exact gas flow desired under a given set of inlet and delivery pressure conditions, it is fixed therein.

This adjustable orifice consists essentially of a length of small bore tubing 73 such as a hypodermic tubing into which is inserted a length of smooth mandrel 74, piano wire being a preferred embodiment thereof. The relative diameters of the adjacently located tubing 73 and the wire 74 are dependent upon the gas flow range desired. The nominal tube inside cross sectional area, less the nominal wire cross sectional area, should provide an area difference slightly greater than that required to pass the maximum desired gas flow. When the wire is inserted in the tube, a restricted gas flow passage 72 is formed having a relatively large wall area with respect to the cross sectional gas flow area.

In that the flow through a pipe depends, among other things, upon the wall friction or back drag on the fluid, by varying the effective length of the restricted area by means of the length of wire inserted therein, the wall friction becomes the gas flow determinant. For small gas flows, hypodermic tubing with an inside diameter of approximately 0.020-in. and a piece of piano wire with an outside diameter of approximately 0.015-in. was found to provide a desirable flow range. Other tube and wire sizes can be selected for virtually any other desired flow. It was further found that by running the wire in and out, thus varying the wall friction, the flow of gas could be varied nearly 50 percent.

FIG. 2 of the drawings shows the adjustable orifice incorporated into a flowmetering spud assembly 70 comprising a body 75 having at one end an inlet recess 81, at the other end an adjusting recess 82, and a perpendicular outlet 83 therebetween. The inlet connection 71 threadably engages said inlet recess 81 providing a gas tight joint by means of gasket 84. The inlet connection 71 is provided with externally formed threads 86 for engaging a connecting nut, not shown. A concave seating surface 87 leads to the concentric annular chamber 88 which provides an abutment for the sleeve 73 longitudinally disposed therein and previously described.

The other end of body 75 threadably engages a shouldered packing nut 77, fixedly located by locking nut 78. The resilient packing 76 disposed in the concave face of said packing nut 67, squeezes the wire 74, thereby holding it stationary. The packing serves the dual purpose of clamping the wire passing therethrough and also preventing the escape of gas. A suitable substance for this part may be any yieldable material such as Teflon, a fibrous packing, or rubber.

The packing nut 79 is provided on its rear surface with a recess 95 into which the adjustable length wire 74 may extend. For any particular setting desired, the wire 74 may be cut off within the recess 95 and protected by a snap button 79 insertable in said recess.

The outlet of body 75 comprises a cylindrical outlet nipple 33, a curved seating surface 39 thereon and incorporating a suitable hose connecting nut 91. Said nipple 83 extends into chamber 92, which provides communicating means to lateral passages 93 and 94.

The most notable advantage of the metering orifice herein described resides in its simplicity of construction. Since no close dimensional tolerances on the tube, wire, or other parts are required, the basic units are such as to readily lend themselves to mass production. Further, the exact flow for any given inlet and delivery pressure condition is assured by pre-setting the wire of the necessary length within the tube thereby eliminating the use of moving parts.

What is claimed is:

1. A gas ratio control system for delivering a gas mixture, which system comprises in combination; a first gas supply line having an adjustable pressure regulator interposed therein, a second supply line for a different gas, said second line including a second adjustable pressure regulator, control means mutually engaging the flow adjusting stems of said first and second regulators, said control means adapted upon adjustment thereof in accordance with an indicated pressure differential, to increase the gas pressure in one of said regulators, and to simultaneously decrease the pressure in the other of said regulators, said first regulator communicated to the inlet of a pre-set orifice device, the second regulator communicated to the inlet of a flow meter, the outlet of said flow meter communicably joined to the inlet of another pre-set orifice device, each respective inlet of a differential pressure indicator communicated immediately up stream of each of said pre-set orifice devices to provide an indication of pressure difference at said orifice devices inlets, the outlets of said orifices devices communicably joined to combine the respective gas flows issuing therefrom, into a single line, and a valve means positioned in said single line to control the combined gas flow passing therethrough.

2. A gas ratio control system essentially as defined in claim 1 wherein the gases are helium and argon and the pressure regulators are in substantial axial alignment, the adjusting stems of each being fixedly joined by a connecting means, external to each of said regulators.

3. A gas ratio control system essentially as defined in claim 2 wherein the adjacent pressure regulator stems are fixedly joined by a sleeve member extending therebetween.

References Cited in the file of this patent

UNITED STATES PATENTS

| | | |
|---|---|---|
| 336,172 | Sutherland | Feb. 16, 1886 |
| 1,330,513 | Brewer | Feb. 10, 1920 |
| 1,407,098 | Stickler | Feb. 21, 1922 |
| 2,145,114 | Gibbs et al. | Jan. 24, 1939 |
| 2,344,943 | Gooden | Mar. 28, 1944 |
| 2,732,859 | Chace | Jan. 31, 1956 |
| 2,740,426 | Dorfan | Apr. 3, 1956 |
| 2,769,459 | Birkness | Nov. 6, 1956 |

FOREIGN PATENTS

| | | |
|---|---|---|
| 942,606 | France | Sept. 20, 1948 |